Aug. 17, 1954     G. B. HILL ET AL     2,686,396
MOWER PICKUP ATTACHMENT FOR FORAGE HARVESTERS
Filed April 20, 1951     4 Sheets-Sheet 1
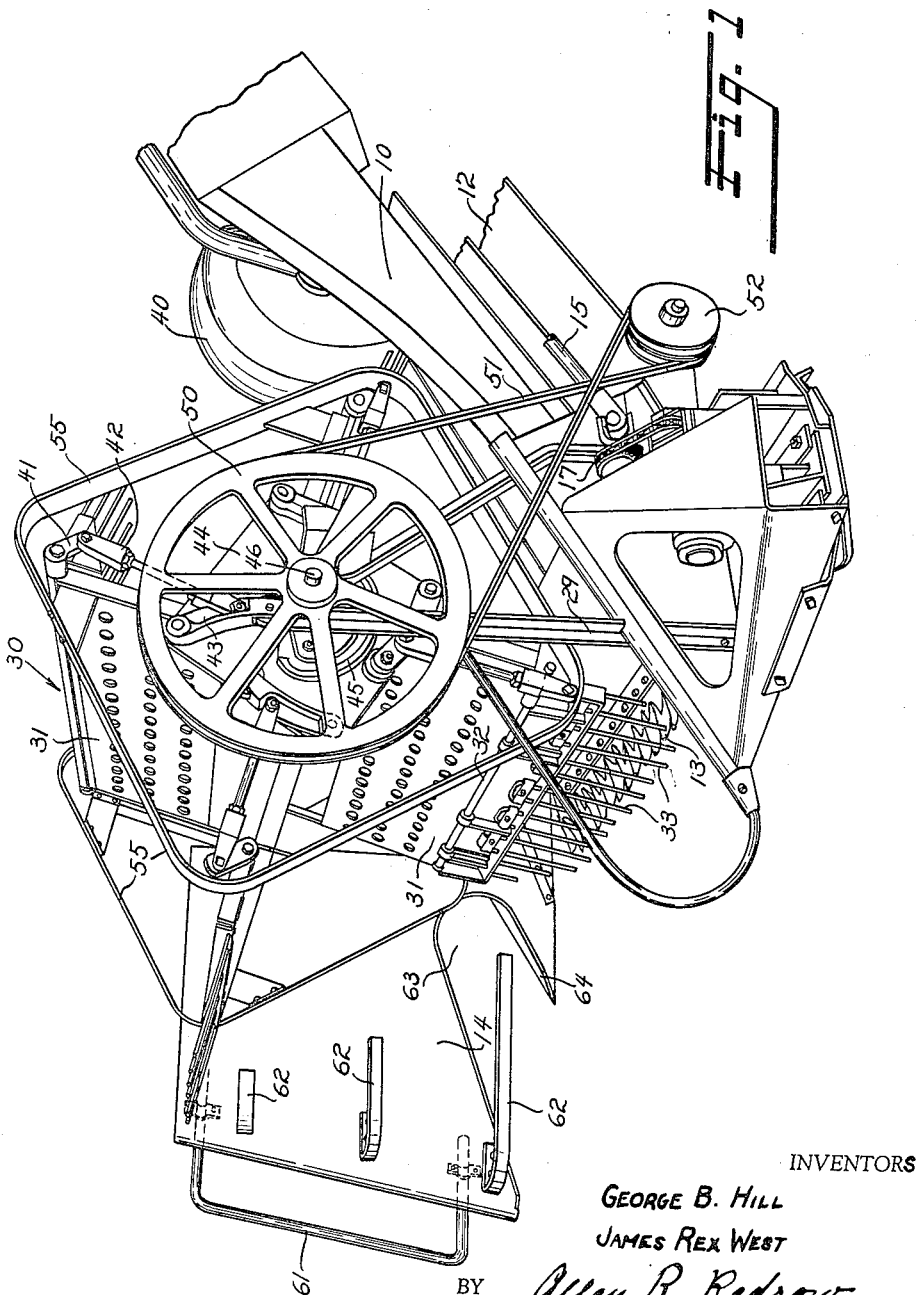
INVENTORS
GEORGE B. HILL
JAMES REX WEST
BY Allan R. Redrow
ATTORNEY

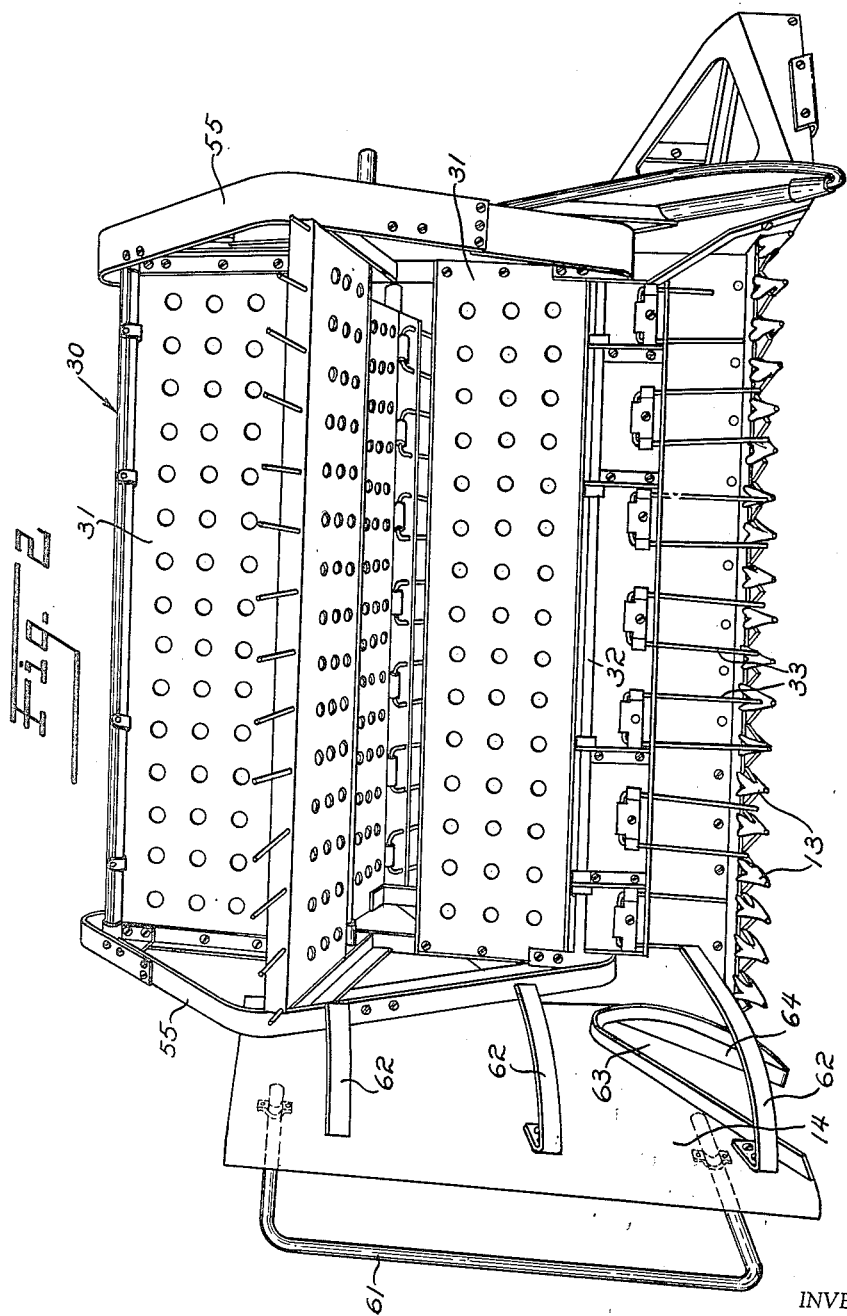

Aug. 17, 1954   G. B. HILL ET AL   2,686,396
MOWER PICKUP ATTACHMENT FOR FORAGE HARVESTERS
Filed April 20, 1951   4 Sheets-Sheet 3
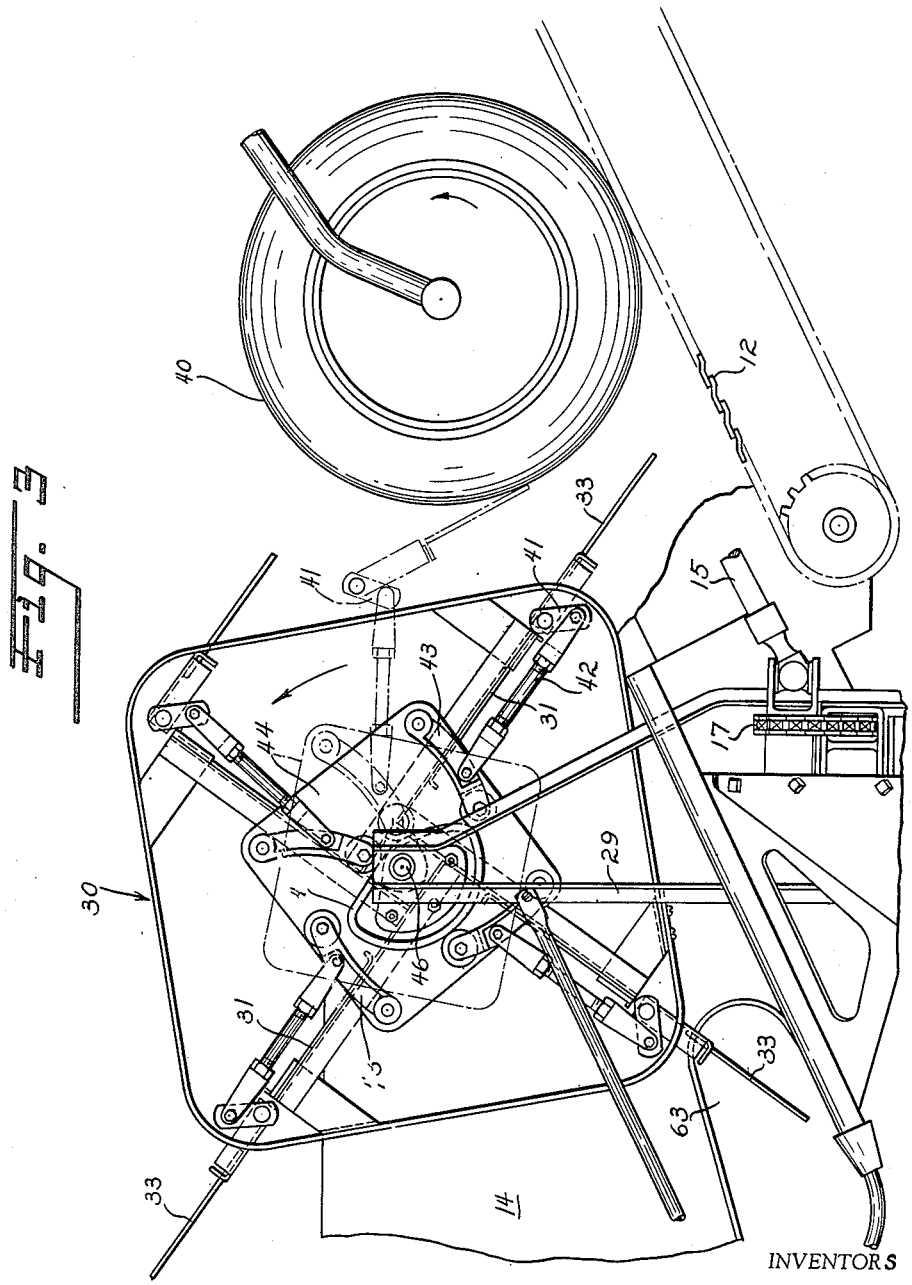
INVENTORS
GEORGE B. HILL
JAMES REX WEST
BY Allan R. Redrow
ATTORNEY

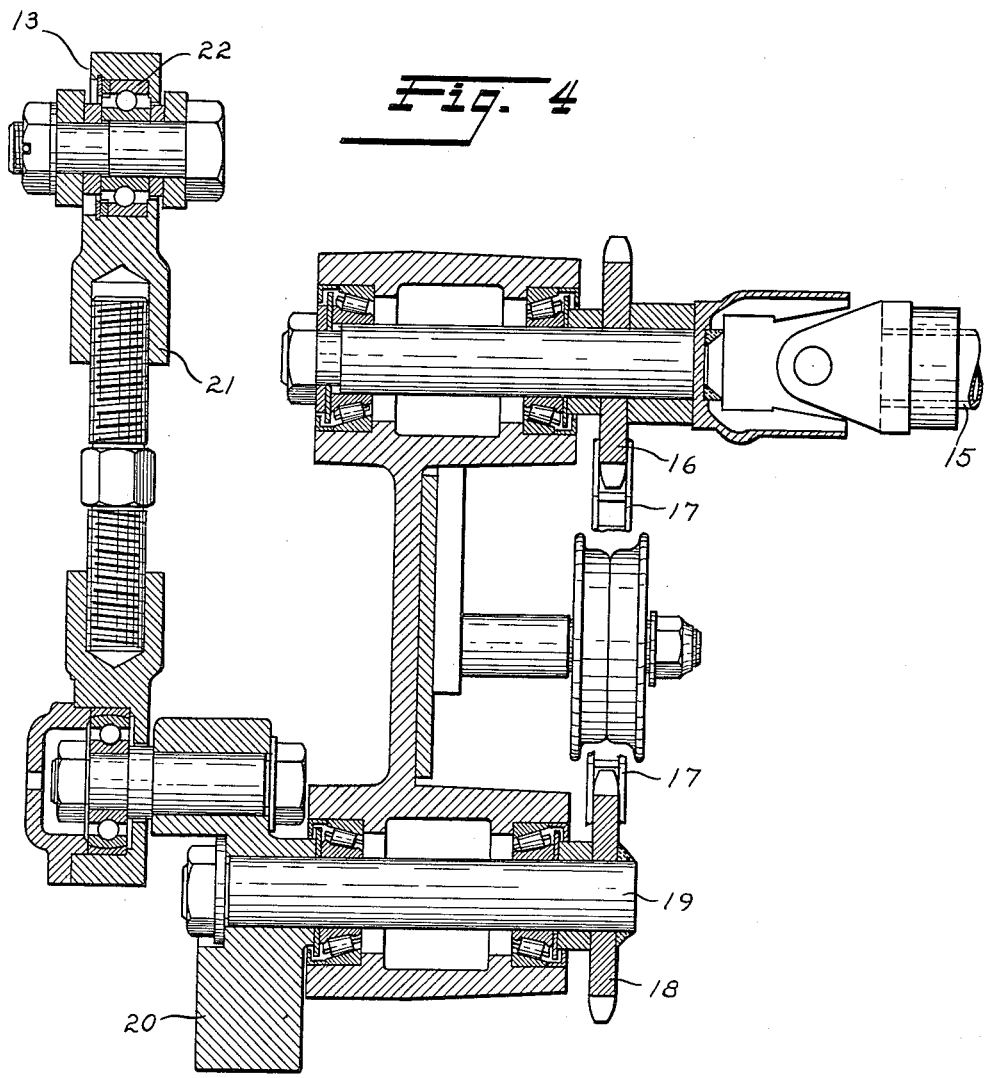

Patented Aug. 17, 1954

2,686,396

UNITED STATES PATENT OFFICE 2,686,396

MOWER PICKUP ATTACHMENT FOR FORAGE HARVESTERS

George B. Hill and James Rex West, New Holland, Pa., assignors to New Holland Machine Division of The Sperry Corporation, New Holland, Pa., a corporation of Delaware Application April 20, 1951, Serial No. 221,998

3 Claims. (Cl. 56—344)

1

This invention relates to harvesters and more particularly to an improved pick-up means for an ensilage harvester, or the like.

Various forms of pick-up means have been proposed for such machines in the past and this invention may be either built into the harvester machine or provided as an attachment adapted to be fitted onto a basic unit of a convertible harvester. The invention includes a reel means for sweeping the crop back through the mouth of the pick-up to deliver it to an elevator conveyor that has a cooperating rotating presser means associated therewith the presser being adapted to engage the crop against the conveyor so that it will be positively fed rearwardly and upwardly into the harvester machine. The reel, elevator, and presser means all function together to lift the crop into the harvester with a minimum of agitation whereby to minimize the shaking off of the more nutritious leaves of the crop being handled. The reel is positioned with respect to each of the other elements of the pick-up so that it feeds the crop being harvested into the bight formed between the conveyor and the periphery of the rotating presser member. The invention, in its preferred form, also includes a mower for cutting a standing crop and a divider may be associated with the pick-up to assist the mower in cutting a clean swath. The bats of the rotating reel are then operative to feed the crop rearwardly and the tips of the bats are movable with respect to the remainder of the bat surface in a manner to continue the pushing force for delivering the crop rearwardly as the reel rotates whereby to positively urge the hay, or the like, into position so that it is engaged between the presser wheel and the upfeeding conveyor.

The invention is shown in detail in the drawings wherein:

Figure 1 is a side perspective of the preferred form of the pick-up forming the subject of this invention;

Figure 2 is a front perspective of the pick-up as shown in Figure 1;

Figure 3 is an enlarged side elevation of the reel and elevator-conveyor assembly; and Figure 4 is an enlarged sectional view of the sickel bar drive mechanism.

In Figure 1, the invention is shown assembled on the elevator conveyor portion of a forage harvester. This machine provides a basic unit having a motor, fan, and chopper for harvesting a hay crop, or the like, and has an endless elevator-conveyor associated with the fan and chopper assembly for conveying the crop from the pick-

2 up back into the harvesting means. The conveying system includes a rotating presser wheel which engages against the top of the conveyor, the wheel lifting up as the crop passes under it and being driven to rotate at approximately the same speed as the surface of the upwardly moving top flight of the conveyor. In using this harvester machine, several different types of pick-up mechanisms may be mounted over the elevator conveyor for handling different kinds of crops such as hay or corn, and the like.

The present invention is an improved form of pick-up mechanism adapted to be mounted on such a machine and it is adapted to be carried in position for cooperation with the elevator-conveyor and the presser wheel to accomplish delivery of the cut crop up into the harvesting mechanism. The pick-up attachment here shown includes a suitable funnel-shaped feed pan 10 having an open bottom that is adapted to fit over the upwardly moving top flight of the endless elevator-conveyor 12, see Figure 3, so that as the cut crop is delivered through the mouth of the pick-up and fed backwardly, the sides of the funnel-shaped feed pan direct the hay onto the upwardly feeding surface of the elevator-conveyor. The feed pan 10 is mounted on a suitable framework that is adapted for quick attachment to the basic forage harvester unit to hold the pick-up in proper association with the elevator-conveyor. The pick-up frame is also arranged to support a suitable mower 13 and a divider 14 at its front end, that cooperate to effect the cutting of a standing crop and to assist in the feeding of the cut crop through the mouth of the pick-up by means of the reel.

The pick-up frame is mounted to be substantially integral with the elevator frame structure and as the elevator may be raised and lowered, the pick-up mechanism here shown is raised and lowered as a unit with it. The raising and lowering of the elevator-conveyor framework, may be used as an adjustment for positioning the mower with respect to the crop to be cut.

The mower 13, mounted on the lower front end of the frame, provides a conventional cutter mechanism having suitable guards and a reciprocating sickle bar for severing the stems of the standing crop. The sickle bar receives its driving power through shaft 15 which is driven from suitable means connected through a common gear box drive for the harvester mechanism. The drive shaft 15 is connected at its lower end, through a universal joint one side of which may be integral with a sprocket wheel 16 that drives the chain 17 that is trained over the sprocket wheel 18. Sprocket wheel 18 is keyed to a shaft 19 that drives a counterbalanced crank means 20 and the rotation of the crank 20 is transmitted through an adjustable connecting link 21 with the sickle bar 13 by means of the ball bearing connection 22. This drive system provides a very quiet, efficient and positive reciprocating drive force for moving the sickle bar.

Supported over the sickle bar on the front end of the pick-up, is a reel structure 30 having a plurality of bats for engaging the crop and sweeping it back in through the mouth of the pick-up so that it may be delivered onto the elevator conveyor. The reel is operative to sweep the crop positively back against the mower 13 and the reel continues the feeding motion to deliver the crop rearwardly onto the elevator conveyor.

The reel 30 is supported for rotary motion at the upper end of the standards 31, one of which is mounted on each side of the front end of the pick-up frame. The bats that form reel 30, each have a rather wide surface area and at their tip ends, the bats are provided with a hinged joint 32 so that the outer ends of each of the bat surfaces may be moved to accomplish a more positive and gentle feeding of the crop as will appear more fully below. The tip end of each of the bat surfaces is provided with a plurality of fingers 33 for engaging in the crop and forcing it backwardly as the reel rotates and yet the fingers may be readily withdrawn from the crop, as is obvious.

Each of the movable tip ends of the several bat structures is operated by means of a cam drive which functions to turn the respective movable tip ends in the desired manner to force the crop backwardly into the bight formed between the elevator-conveyor 12 and the presser wheel 40 as will be seen best by referring to Figure 3. Each of the tip ends of the movable portions of the bats has a crank 41 fixed integral thereto and crank 41 is connected by a link 42 with a link 43 that is carried on the rotating center plate 44 that is mounted integral with the bats and axle of the reel structure. As the plate 44 rotates with the reel, the lever 43 at its outer end engages the surface of a stationary cam 45 so that the lever 43 is pushed in and out with respect to the axle 46 about which the reel rotates. As the lever 43 is pushed outwardly relative to axle 46, the link 42 pushes crank 41 to force the movable surface of the bat into alignment with the remainder of the surface of bat 31. The bat occupies this position as it sweeps down across the top of the crop and into the sickle.

As the crop is moved rearwardly over the sickle, the cam follower link 43 moves off of the cam surface 45 and the crank 41 is permitted to turn backwardly. During the portion of a revolution while the reel rotates from the full line position shown in Figure 3 to the dotted line position there shown, it is apparent that the crop will be always engaged by the movable portion of the bat in such a way as to be forced positively into the bight formed between the wheel 40 and the conveyor 12. As wheel 40 rotates then, the crop is positively engaged against the elevator-conveyor and is forced upwardly with the conveyor, there being no possibility of a fluffy type of hay crop or the like, balling up, collecting or building up in front of the wheel 40 rather than being forced under it and fed up into the harvesting machine.

The reel 30 is driven from a pulley 50 which is keyed to the axle 46 and pulley 50 is adapted to be driven by a V-belt 51 which, in turn, is driven from pulley 52 that may be keyed to the axle which supports the lower end of the endless upfeed conveyor 12. Any other suitable drive could be provided for reel 30.

Referring to Figure 2, it will be seen that suitable guard straps 55 are mounted at each end of the reel to cover the cranks 41 and the plate 44 and cam followers 43 and the support arms for bats 32. The use of a simple band as here shown around each end of the reel serves to prevent any hay from being wrapped around in the cam mechanism or the axle support at the other end of the reel, which would interfere with the proper rotation of the reel and actuation of the movable tips of the bat elements of the reel.

The divider 14 is mounted on the front end of the frame structure of the pick-up and is adapted to cooperate with the reel by making a clean separation of a swath of the hay from the rest of the standing hay crop. At its forward end, the divider 14 has a U-shaped rod 61 mounted on it with the open-end of the U facing backwardly. The rod 61 may be adjusted inwardly or outwardly with respect to the front edge of the divider so that in effect the divider can be made longer or shorter as may be found necessary in harvesting crops of different types; for example, the maize or sorgo crops as distinguished from alfalfa or some of the more fluffy hay crops.

The divider 14 has a plurality of free-ended spring arms 62 fixed to its inside surface for pushing the crop into the reel and directing it rearwardly into the sickle bar. The arms 62 also direct the crop inwardly somewhat so that the hay passes around the guard straps 55 to assist the reel in feeding the crop rearwardly through the mouth of the pick-up structure.

At its lower edge, the divider 14 is provided with a rearwardly and upwardly directed slot 63 to permit any down grain or hay that has been pushed over, to be pulled upwardly so that it may be presented to the sickle 13. To assist in this combing or straightening action, a point 64 is provided at the rear edge of slot 63 to lift up the down grain and insure that the maize or hay is properly positioned to be cut by the sickle 13.

Another important feature of this invention is concerned with the adjustable mounting of the cam for controlling the movement of the bat tips, it being possible to change the position of cam 45 to alter the angular position that the bats occupy as they approach the periphery of the presser wheel. The cam 45 is adjusted to cause the bat tips and fingers 33 to remain partially projected for a longer time as each bat passes the bight formed between the presser wheel and the elevator conveyor to force the shorter cuts of hay or other forage crop into the bight. When longer hay crops or the like are being harvested, the cam is set to permit the bat tips to move out of the crop by being turned to or disposed in a position that is more nearly perpendicular with respect to the ground. It is essential that such adjustment be provided in order to accommodate the harvester to different types of crops. The shorter crops must be pushed more firmly into the bight under the presser wheel to cause the positive engagement of the crop on the up-feeding conveyor. On the other hand the longer crops can be properly fed in without such a long continued pushing effect, and further, the bats must be stripped from it in a manner to prevent portions of the longer type of crop from wrapping around the reel, thus, in this instance the bat tips are allowed to fall back earlier in completing the final feeding portion of the reel's cycle.

To accomplish the necessary adjustment of the control cam 45, the cam plate is releasably mounted on one of the side standards 31. The plate is carried on this standard in a fixed position normally, but may be rotated about the axis of the axle 46 to a new position in order to change the setting of the cam for controlling the angle of the bat tips.

In using the pick-up structure described above, the attachment is mounted on the basic unit and the frame is tightened down into position. The cam 45 is adjusted to the proper setting for the length and type of the crop and then the elevator-conveyor is adjusted to position the mower 13 at the desired height. After these details have been attended to and the drives have been started, the machine is ready to be moved through the field. The forage harvester may then be pulled into the field and the divider 14 is operative to knife through the standing crop to separate a swath of the standing crop from the remainder of the crop in the field. The mower 13 then drives into the stems of the crops in the swath and as the crop is severed, it is delivered through the mouth of the pickup and on to the elevator-conveyor.

The reel rotates continuously as the machine moves forwardly and cooperates with the divider 14 to gently engage into the crop and pass it backwardly to the mower. As the crop is pushed back by means of the bats on the reel, the crop is held firmly on the fingers 33 while the reciprocating sickle bar is operative to sever the stems of the crop and then after the crop is pushed back through the mouth of the pick-up, it is pushed firmly into the bight formed between the presser wheel 40 and the upper surface of the elevator-conveyor 12. The wheel 40 is held down by gravity and is driven to rotate by means of the motion of the upper flight of the endless elevator-conveyor. As the wheel 40 rotates in the direction of the arrow, as shown in Figure 3, it engages the crop and presses it down, whereby the motion of the conveyor, together with the pressure created by wheel 40, causes the crop to be positively delivered upwardly. It will be noted that the movable tips of the bats and the fingers 33 are operative to firmly push the crop into the bight formed between the wheel and the conveyor so that a firm pressure is established to accomplish a positive feeding of the crop upwardly.

The pick-up here shown may be used equally well on a hay crop such as alfalfa, clover, or the like or other forage crops such as the sorgos, maize etc. In either case, the mower is operative to sever the crop while the reel holds the crop in the proper altitude for efficient cutting and positively stuffs it into the bight formed between the presser wheel and the elevator-conveyor surface with a minimum of agitation, thus saving most of the more valuable leafy portions of the forage crops.

The above description covers the preferred form of this invention. It is apparent that many modifications thereof may occur to those skilled in the art which will fall within the scope of the following claims:

We claim:
1. A crop pick-up mechanism comprising an endless conveyor, a rotatable crop presser and means floatingly positioning same on said conveyor in driven engagement with the crop material on said conveyor, a pick-up chute opening toward said conveyor, a rotary reel mounted over said chute for rotation about an axis parallel to that of the presser to urge the crop onto the conveyor, said reel having a radially retractable bat portion, the outer extremity of said portion rotating in a common plane with the radially outer most regions of said crop presser in its extended condition being spaced from the reel axis a distance greater than the distance from said axis to the presser, means for normally maintaining said bat portion in extended condition and for retracting said portion as it rotates past said presser.

2. A crop pick-up mechanism comprising an endless conveyor, a rotatable crop presser operatively mounted above said conveyor to engage the crop and urge it against the conveyor, a pick-up chute opening toward said conveyor, a rotary reel mounted over said chute for rotation about an axis parallel to that of the presser, to urge the crop onto the conveyor, said reel having bat portions hinged thereon at axially eccentric locations, means for maintaining the said bat portions normally and radially extended positions with their outer extremities spaced from the reel axis a distance greater than the distance between said axis and the said presser, and means for successively swinging said bat portions rearwardly relative to their rotation as each in turn moves past said presser, thus permitting said bat portions to move under said presser and force the crop between said presser and said conveyor while nevertheless permitting said bat portions to rotate past the presser.

3. A mechanism as defined in claim 1 wherein said means for normally maintaining said bat portion in extended condition and for retracting said portion as it rotates past said presser comprises a stationary cam element mounted adjacent the rotational axis of said reel, actuating levers pivoted to said reel, followers carried at the free ends of the respective levers in operative engagement with the cam element, and links operatively connecting said levers to the respective portions.

References Cited in the file of this patent

UNITED STATES PATENTS

| Number | Name | Date |
| --- | --- | --- |
| 1,172,033 | Mueller | Feb. 15, 1916 |
| 1,707,878 | Roosa | Apr. 2, 1929 |
| 1,882,875 | Pierson | Oct. 18, 1932 |
| 2,203,418 | Mills | June 4, 1940 |
| 2,294,646 | Young | Sept. 1, 1942 |
| 2,332,025 | Stone et al. | Oct. 19, 1943 |
| 2,413,072 | Sage | Dec. 24, 1946 |
| 2,431,397 | Harrison | Nov. 25, 1947 |
| 2,455,905 | Ronning et al. | Dec. 7, 1948 |
| 2,521,999 | Scott | Sept. 12, 1950 |

FOREIGN PATENTS

| Number | Country | Date |
| --- | --- | --- |
| 247,168 | Switzerland | Nov. 7, 1947 |